United States Patent [19]
Wilhite

[11] Patent Number: 6,050,167
[45] Date of Patent: Apr. 18, 2000

[54] SAW TABLE GAUGE BLOCK

[76] Inventor: William Wilhite, 2689 Village La. 9, Bossier City, La. 71112

[21] Appl. No.: 09/072,178

[22] Filed: May 5, 1998

[51] Int. Cl.[7] ........................................ B26D 7/01
[52] U.S. Cl. ........................................ 83/438; 83/522.15
[58] Field of Search .............................. 33/640, 630, 628, 33/613, 567, 42; 83/44, 438, 441.1, 522.29, 522.25, 522.15, 468, 468.7, 247, 268, 522.19; 269/900, 303, 305, 315

[56] References Cited

U.S. PATENT DOCUMENTS

| | | | |
|---|---|---|---|
| 688,334 | 12/1901 | Redpath | 83/438 |
| 785,699 | 3/1905 | Bemis | 83/468 |
| 2,536,401 | 1/1951 | Victor | 33/567 |
| 2,621,807 | 12/1952 | Rendich | 33/562 |
| 3,095,673 | 7/1963 | Born, Jr. et al. | 83/468 |
| 3,188,078 | 6/1965 | Peterson | 269/305 |
| 3,201,873 | 8/1965 | Bell et al. | 33/42 |
| 3,425,134 | 2/1969 | Christensen | 33/628 |
| 4,043,045 | 8/1977 | Rodriguez | 33/567 |
| 4,644,663 | 2/1987 | Needs | 33/42 |
| 4,869,304 | 9/1989 | Gore | 33/42 |
| 5,197,365 | 3/1993 | Clifton | 83/522.19 |
| 5,562,277 | 10/1996 | Swann et al. | 269/900 |

*Primary Examiner*—Rinaldi I. Rada
*Assistant Examiner*—Omar Flores Sánchez
*Attorney, Agent, or Firm*—Brady, O'Boyle & Gates

[57] ABSTRACT

A saw table gauge block having a polygonal, cross-sectional configuration. A pair of axially spaced pegs are secured to each facet of the block and extend outwardly therefrom. At least one end face of the block is provided with indicia representing increments of a unit of length alignable with corresponding units of length on a scale applied to the saw table. The pegs are insertable into apertures in the saw table for holding the gauge block at a position on the table for cutting a workpiece to a desired length.

9 Claims, 4 Drawing Sheets

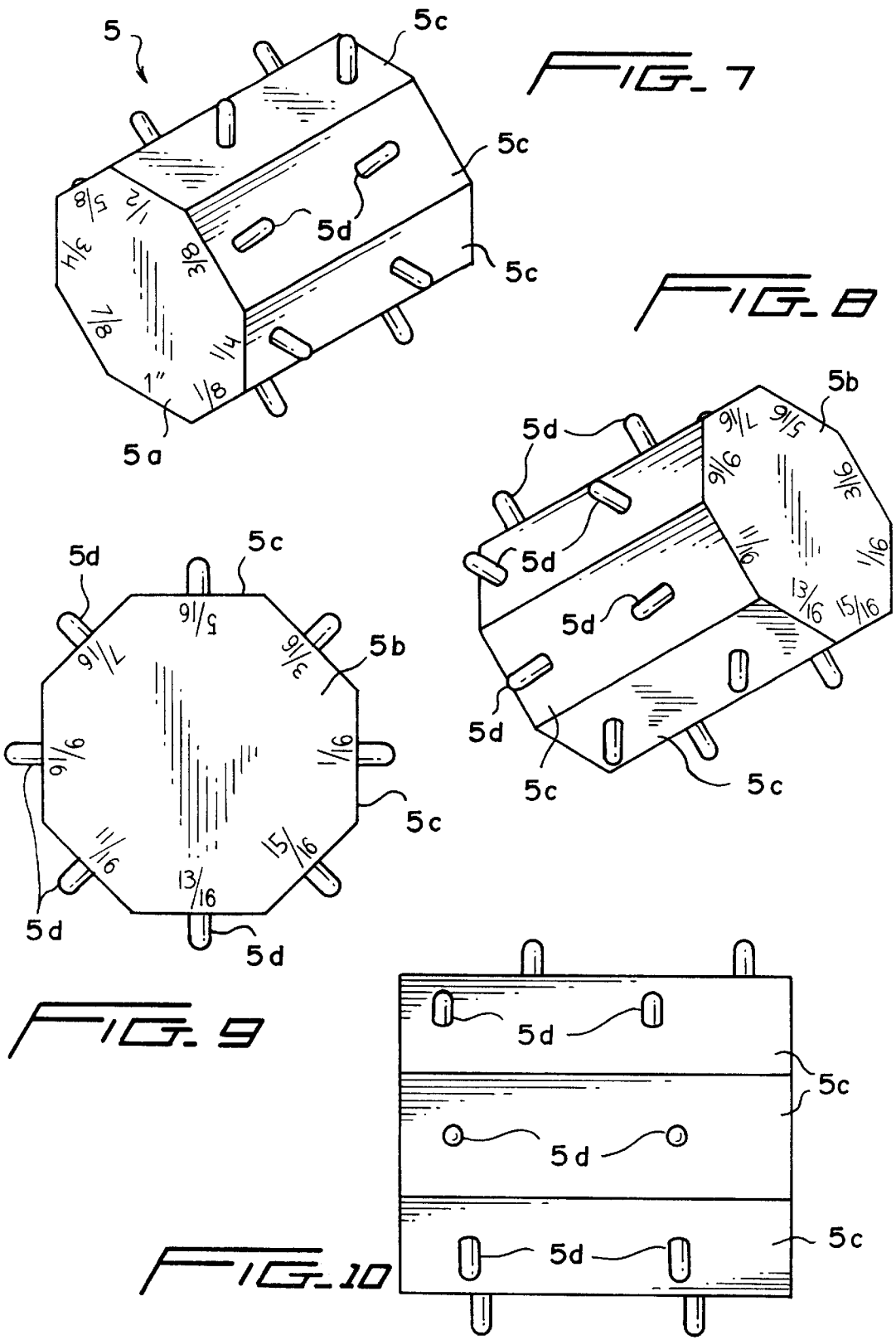

SAW TABLE GAUGE BLOCK

BACKGROUND OF THE INVENTION

Various adjustable gauge blocks have been proposed for machines, such as a saw table, wherein the gauge blocks can be set for establishing a desired dimension at which the workpiece is to be cut. The gauge blocks are normally slidably mounted on the table and held at a selected position by a set screw.

While these gauge blocks have been satisfactory for their intended purpose, they have been characterized by certain disadvantages in that it can be time consuming to slide the block to a particular location and then to tighten the set screw to fix the gauge block at a precise location adjacent a scale on the table to establish the desired dimension at which the workpiece is to be cut. Furthermore, when individually cutting a plurality of workpieces to the same dimension, the abutting of each workpiece against the block and the normal vibration of the table during the cutting operation causes the set screw to loosen, resulting in the gauge block moving from the fixed position, thus, requiring the operator to stop the machine and reset the gauge block.

After considerable research and experimentation, the gauge block of the present invention has been devised which can be easily and quickly fixed to a saw table at a desired location adjacent a scale on the table, whereby the gauge block will remain stationary at the desired location during the entire time of the cutting operation.

SUMMARY OF THE INVENTION

The saw table gauge block of the present invention comprises, essentially, a table having a plurality of apertures, one-inch on centers, and a polygonal block having end faces and side facets. A pair of axially spaced pegs are secured to each facet of the block and extend outwardly therefrom. The end faces of the block are provided with indicia representing increments of a unit of length, such as an inch. The edge of the table is provided with a scale having indicia representing units of length, corresponding to the units of length indicia on the end faces of the block. In use, the increment of length indicia on the end face of the block, at which the workpiece or stock is to be cut, is positioned on the top surface of the table and aligned with the corresponding indicia on the scale. The pegs on the particular facet, aligned with the increment of length indicia on the end face of the block, are inserted into the apertures in the table, to thereby hold the block on the table, whereby stock can be cut at a desired length while abutting the block.

BRIEF DESCRIPTION OF THE DRAWINGS

FIG. 7 is a perspective view of another embodiment of the gauge block of the present invention having indicia on one end face of the block representing a first set of increments of length;

FIG. 8 is a perspective view of the gauge block illustrated in FIG. 7, showing indicia on the opposite end face of the block representing a second set of increments of length;

FIG. 9 is an end elevational view of the gauge block shown in FIG. 8;

FIG. 10 is a side elevational view of the gauge block shown in FIG. 8;

DESCRIPTION OF THE PREFERRED EMBODIMENTS

Figure 1:
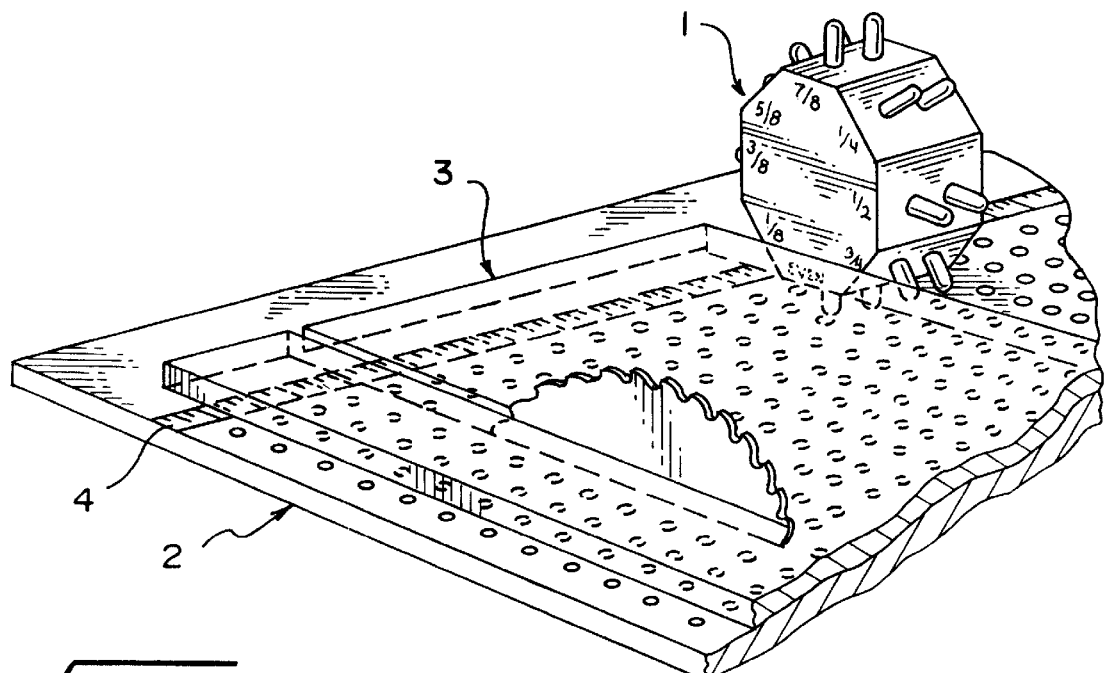
FIG. 1 is a perspective view of the saw table and one embodiment of the gauge block of the present invention mounted in operative position on the table.
Figure 2:
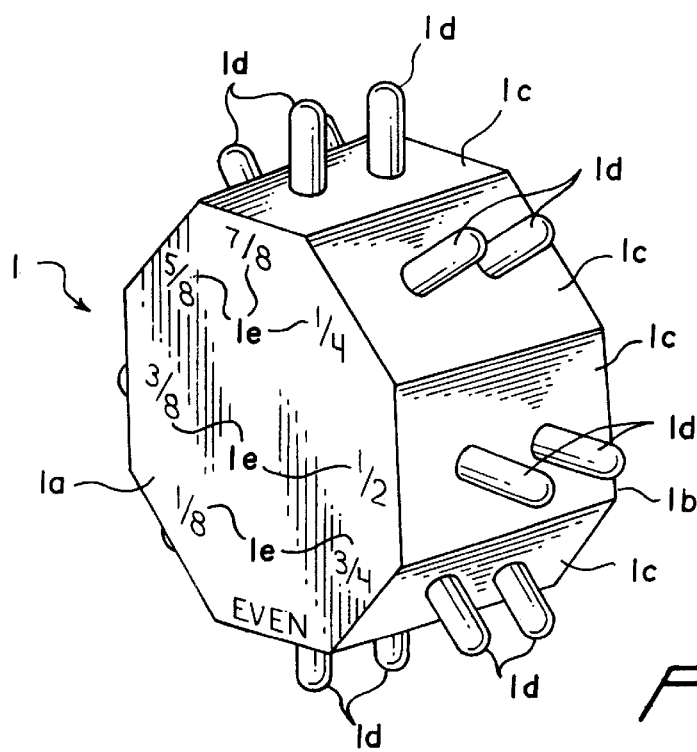
FIG. 2 is a perspective view of the gauge block shown in FIG. 1.

Referring to the drawings and, more particularly, to FIG. 1, one embodiment of the gauge block 1 of the present invention is shown mounted in operative position on an apertured saw table 2, having a saw 2a, and abutting a workpiece 3 being cut to a desired length.

The details of the construction of the gauge block 1 are shown in FIGS. 2 to 6, wherein a block having a polygonal, such as an octagonal, cross-sectional configuration, is provided with end faces 1a, 1b, and side facets 1c. A pair of pegs 1d, axially spaced one-inch on centers, is secured to each facet 1c and extends outwardly therefrom.

Figure 3:
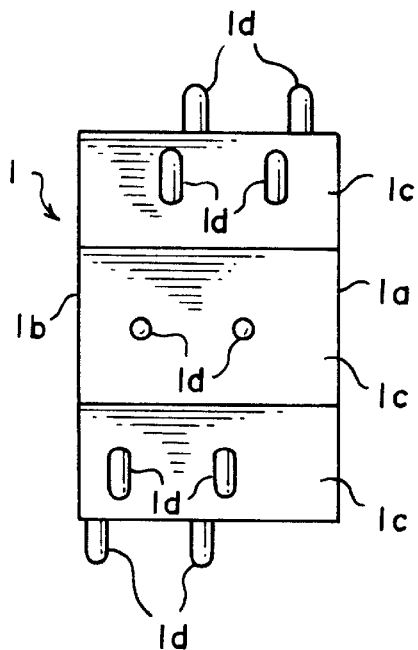
FIG. 3 is a side elevational view of the gauge block illustrated in FIG. 2, showing the axially spaced pegs extending outwardly from the facets of the polygonal block.
Figure 4:
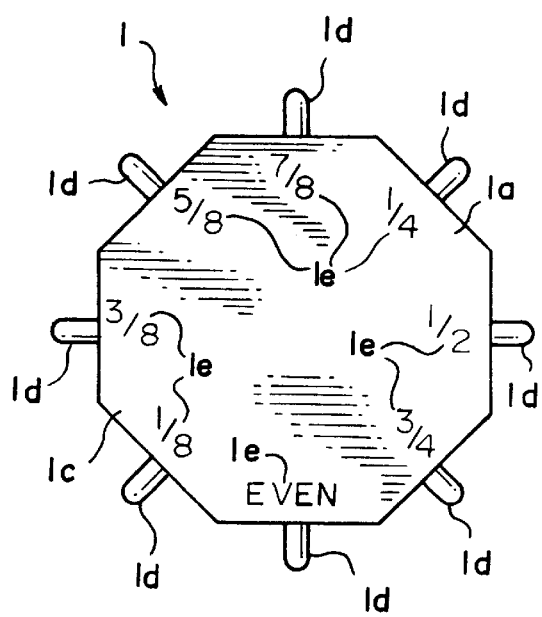
FIG. 4 is an end elevational view of the gauge block of FIG. 2, showing indicia representing increments of a unit of length on an end face of the block.
Figure 6:
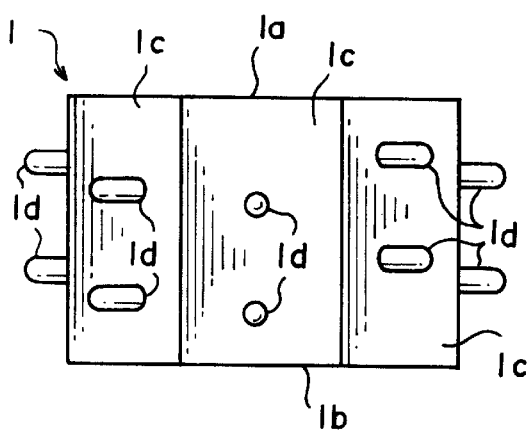
FIG. 6 is a side elevational view of the block illustrated in FIG. 5, but showing the position of the spaced pegs on their respective facets corresponding to the respective sequential indicia, "¾," "even," "⅛," "⅜," and "⅝;"
Figure 5:
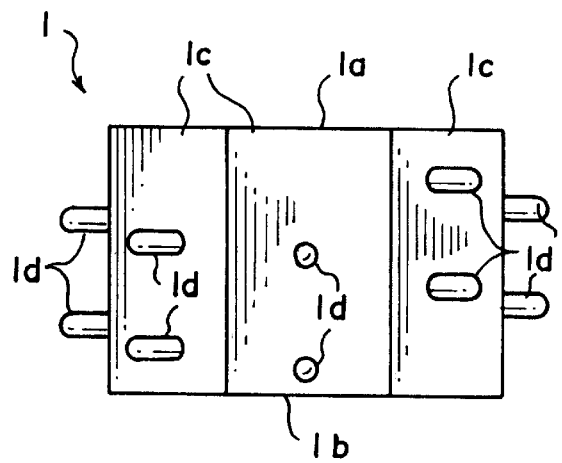
FIG. 5 is a side elevational view of the block illustrated in FIG. 4, showing the position of the spaced pegs on their respective facets corresponding to the respective sequential indicia, "½," "¾," "even," "⅛," and "⅜;"

The end face 1a of the gauge block 1 is provided with indicia 1e, representing various increments of a unit of length, such as an inch. Each indicia 1e is aligned with a respective pair of pegs 1d, variably spaced from the end face 1a, whereby the pairs of pegs 1d are positioned in a helical path around the periphery of the block 1 as shown in FIG. 3. To form the helical path, the pair of pegs 1d, aligned with the "even" indicia 1e, is positioned 1¼" from the end face 1a; the pair of pegs 1d, aligned with the "⅛" indicia 1e, is positioned 1⅛" from the end face 1a; the pair of pegs 1d, aligned with the ⅜" indicia, is positioned ⅞" from the end face 1a; the pair of pegs 1d, aligned with the "⅝" indicia, is positioned ⅝" from the end face 1a; the pair of pegs 1d, aligned with the "⅞" indicia, is positioned ⅜" from the end face 1a, the pair of pegs 1d, aligned with the "¼" indicia, is positioned 1" from the end face 1a; the pair of pegs 1d, aligned of pegs 1d, aligned with the "½" indicia, is positioned ¾" from the end face 1a; and the pair of pegs 1d, aligned with the "¾" indicia, is positioned ½" from the end face 1a.

Figure 11:
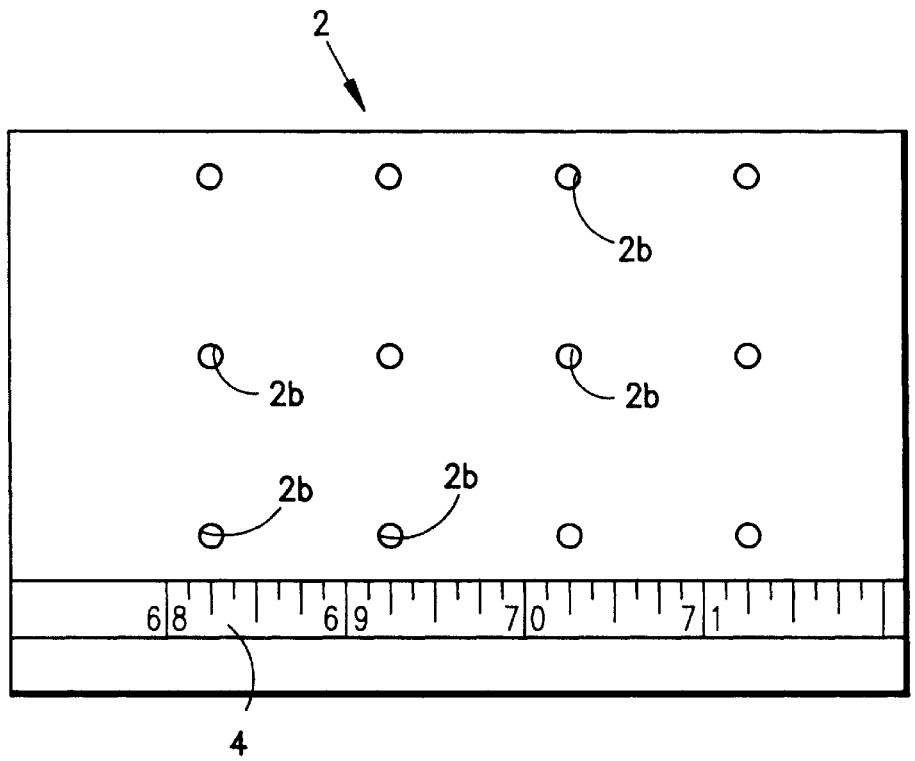
FIG. 11 is a top plan view of the apertured table having a unit of length scale secured to the table at a position for use with the gauge block shown in FIG. 2.

The gauge block 1 is adapted for use on the apertured saw table 2 shown in FIG. 11, wherein apertures 2b extend through the top surface of the table and are arranged in rows and columns and spaced one-inch on centers for receiving the pairs of pegs 1d on the gauge block 1. A measuring tape 4 having indicia representing increments of a unit of length, such as ⅛" increments, is applied to the table 2 adjacent one edge thereof, and positioned thereon so that the ¼" increment of each inch is positioned in alignment with the adjacent apertures 2b. By this construction and arrangement, if it is desired to cut a workpiece 3 at an even inch, such as 70 inches, the facet 1c of the block 1, aligned with the "even" indicia 1e on the end face 1a of the block, is placed on the top surface of the table 2 with the "even" indicia, aligned with the 70-inch mark on the tape 4. The block 1 is then pushed downwardly to insert the respective pair of pegs 1d into the apertures 2b. The gauge block 1 will then be firmly held on the saw table 2 while the workpiece 3, or a plurality of workpieces, are cut to a length of 70 inches. To cut the workpiece 3 at other lengths, the gauge block 1 is manipulated in the same manner by placing the particular facet 1c, aligned with the particular increment of length indicia 1e on the top surface of the table 2, with the desired increment, aligned with the desired length indicia on the tape 4, and then pushing the block 1 downwardly to insert the respective pair of pegs into the apertures 2b.

While FIGS. 1 to 6 show an embodiment of the gauge block 1, wherein the indicia 1e representing increments of a unit of length is applied to only one end face 1a of the block 1 and the pegs 1d are axially spaced one inch on centers, FIGS. 7 to 10 illustrate another embodiment of the gauge block 5 of the present invention having end faces 5a, 5b, and side facet 5c. The pair of pegs 5d, extending outwardly from the facets 5c, are spaced two inches on centers. The end face 5a of the gauge block 5 is provided with indicia 5e, representing increments of length, such as 1/8" and multiples thereof, similar to the indicia 1e on the end face 1a of block 1, shown in FIGS. 1 to 6. The opposite end face 5b is also provided with indicia 5f, representing increments of length, such as 1/16" and multiples thereof.

Figure 12:
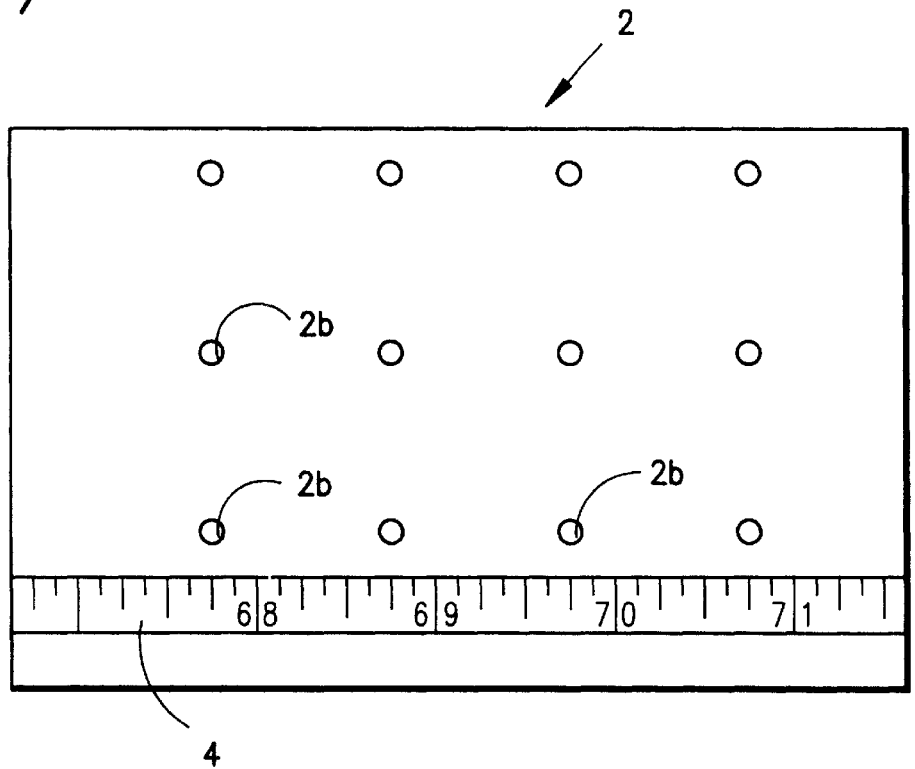
FIG. 12 is a top plan view of the apertured table having a unit of length scale secured to the table at a position for use with the gauge block shown in FIGS. 7 and 8.

When using the gauge block 5, the measuring tape 4 is applied to the table 2, adjacent one edge thereof, and positioned thereon, as shown in FIG. 12, so that the 3/4" increment of each inch is positioned in alignment with the adjacent apertures 2a. By this construction and arrangement, if it is desired to cut a workpiece 3 to a length having a 1/8" increment or multiple there)f, the gauge block 5 is secured to the table 2 at the desired length so that the workpiece 3, to be cut, will abut the end face 5a, containing the "1/8" indicia 5e, in a manner shown in FIG. 1. If it is desired to cut a workpiece 3 to a length having a 1/16" increment or multiple thereof, the gauge block 5 is secured to the table 2 at the desired length so that the workpiece 3, to be cut, will abut the end face 5b containing the 1/16" indicia 5f.

To complete the description of the gauge block 5, each indicia 5e and 5f is aligned with a respective pair of pegs 5d variably spaced from the end faces 5a and 5b, whereby the pairs of pegs 5d are positioned in a helical path around the periphery of the block as shown in FIG. 10 in a manner similar to that shown in the embodiment of the block 1 illustrated in FIGS. 1 to 6.

From the above description, it will be appreciated by those skilled in the art that the saw table gauge block of the present invention is an improvement on heretofore employed gauge blocks in that it is simple in construction and can be easily fixed to the table adjacent the scale at a position for cutting a workpiece or a plurality of workpieces to a desired length. The insertion of the gauge block pegs into the apertures in the saw table holds the gauge block at the desired position to thereby prevent the gauge block from moving during the cutting operation.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. The combination of a saw table and a gauge block, a plurality of apertures extending through the top surface of the table, said apertures being spaced and arranged in rows and columns, said gauge block comprising a block, said block having a polygonal cross-sectional configuration, said block having first and second end faces, and a plurality of side facets, at least one peg connected to each side facet and extending outwardly therefrom, indicia representing various increments of a unit of length provided on the first end face of the block, each increment of length indicia being aligned with a peg on a respective side facet, a measuring tape having indicia representing increments of a unit of length mounted on the saw table adjacent an edge thereof whereby the gauge block can be positioned on the table by aligning the indicia on the end face of the block with the corresponding indicia on the measuring tape at which length a workpiece is to be cut, and the peg on the block being inserted into an aperture in the table, to thereby fix and maintain the gauge block at the desired position during the cutting operation.

2. The combination of a saw table and a gauge block according to claim 1, wherein the apertures are spaced one inch on centers.

3. The combination of a saw table and a gauge block according to claim 1, wherein the block has an octagonal, cross-sectional configuration.

4. The combination of a saw table and a gauge block according to claim 1, wherein a pair of spaced pegs are connected to each facet.

5. The combination of a saw table and a gauge block according to claim 4, wherein a pair of spaced pegs are connected to each facet, said pegs being spaced one inch on centers.

6. The combination of a saw table and a gauge block according to claim 4, wherein a pair of spaced pegs are connected to each facet, said pegs being spaced two inches on center.

7. The combination of a saw table and a gauge block according to claim 1, wherein indicia representing various increments of a unit of length provided on the second end face of the block, the indicia on the second end face being different from the indicia on the first end face.

8. The combination of a saw table and a gauge block according to claim 4, wherein the pairs of spaced pegs extend in a helical path around the peripheral surface of the block.

9. A gauge block for a work table having a tape measure comprising a block having a polygonal cross-sectional configuration, said block having a pair of spaced end faces and a plurality of side facets, said facets extending around all sides of the block, indicia representing various increments of a unit of length provided on at least one end face, each increment of length indicia being aligned with a respective side facet, and means for connecting the gauge block to the work table to align the indicia on the end face of the block with the corresponding indicia on the tape measure.

* * * * *